United States Patent Office 3,492,115
Patented Jan. 27, 1970

3,492,115
METHOD FOR PREPARING COPPER PRODUCTS FROM COPPER PRECIPITATE
Shalom Mahalla, P.O. Box 11183, Phoenix, Ariz. 85036
Continuation-in-part of applications Ser. No. 290,842, June 26, 1963, Ser. No. 311,045, and Ser. No. 311,065, Sept. 24, 1963. This application Dec. 27, 1966, Ser. No. 604,872
Int. Cl. C22b 15/10, 3/00
U.S. Cl. 75—103    10 Claims

ABSTRACT OF THE DISCLOSURE

Finely divided copper metal or cuprous oxide products are prepared from copper precipitate starting material by separating a copper concentrate from the copper precipitate, reacting the copper concentrate with oxygen and complexing reagents to prepare a solution of cupric ammonia complex, reducing the cupric ammonia complex to the corresponding cuprous ammonia complex, and decomposing the cuprous ammonia complex to obtain a copper product and recover the complexing reagents which are recycled for use in preparing additional cupric complex.

---

This application is a continuation in part of my prior filed co-pending applications Ser. No. 290,842, filed June 26, 1963 now abandoned; Ser. No. 311,045, filed Sept. 24, 1963 now abandoned; and Ser. No. 311,065, filed Sept. 24, 1963 now abandoned.

This invention relates to methods for preparing valuable copper products from copper precipitate, sometimes known as "cement copper."

More specifically, the invention concerns processes for preparing high-purity copper and cuprous oxide products from cement copper.

In a further aspect, the invention relates to methods and processes for treating cement copper by hydrometallurgical methods to recover such copper products without employing pyrometallurgical or catalytic techniques.

In still another aspect, the invention relates to methods for preparing high-purity copper and cuprous oxide products from cement copper which are specifically adapted to using cement copper as the starting raw material.

As used herein, the term "copper product" means and includes either finely divided copper metal or finely divided bright red cuprous oxide. Furthermore, it will be understood by those skilled in the art that the terms "copper precipitate" and "cement copper" are used interchangeably.

For many years the copper mining industry has produced a low-grade byproduct known as copper precipitate or "cement copper." Cement copper is derived from relatively weak aqueous solutions of copper salts, notably copper sulfate. Such weak solutions of copper salts can be prepared by percolating large quantities of weak sulfuric acid over massive beds of low-grade copper oxide ore. Alternatively, such solutions may be obtained by pumping underground water from copper mines, from spent pickle liquors in brass and copper mills, and in various other operations.

To prepare the copper precipitate or "cement copper," the weak copper-bearing solutions are contacted in large tanks or water storage and distribution vessels with scrap iron. The scrap iron is usually shredded cans or other iron or steel wastes from metal-working and manufacturing operations.

Copper is precipitated from the weak copper sulfate solution according to the following equation:

[1]  $CuSO_4 + Fe \rightarrow FeSO_4 + Cu$

The resultant fine copper precipitate sludge or "cement copper" is heavily contaminated with iron and contains substantial amounts of other impurities such as carbonaceous materials, base metals and basic metallic salts, etc. In a typical case, the cement copper will average upwards of 60%–85% copper. For example, a typical cement copper, after removal from the precipitation tanks, exhibits the following characteristics:

TABLE A

| Screen Size | Percent Weight | Impurities | |
|---|---|---|---|
| +65 | 6.1 | Acid insolubles | 2.7 |
| +100 | 1.6 | Ammonia insolubles | 4.3 |
| +200 | 3.4 | Copper content | 81.5 |
| +325 | 7.6 | | |
| −325 | 81.3 | | |

Cement copper particles are dendritic, a characteristic that imparts a distinct advantage in the field of powder metallurgy as the particles tend to bind together when subjected to high pressures. This advantage is offset, however, by the presence of many impurities in cement copper which render the material unsuitable for direct use in powder metallurgy and related fields.

Consequently, prior to my invention, cement copper was never regarded as suitable for semi-direct conversion to valuable copper products by purely chemical methods. Rather, cement copper was ordinarily introduced into the pyrometallurgical copper smelting process, either at the reverberatory furnace or the converting stage. In one instance, cement copper was converted to useful copper products by dissolving the cement copper in sulfuric acid followed by electrolysis of the copper sulfate. More recently, cement copper was dissolved in the sulfuric acid and the resulting copper sulfate was catalytically reduced at elevated pressure with hydrogen. However, such electrolytic or catalytic reduction processes do not favorably compare with chemical purification procedures because of cost and complexity of the operations.

Accordingly, it is a principal object of the present invention to provide processes for preparing high-purity copper products from cement copper.

Another object of the invention is to provide such processes which involve purely chemical transformations of the raw material and which avoid the disadvantages of electrolytic or catalytic processes.

Another principal object of the invention is to provide processes for preparing high-purity copper products without employing pyrometallurgical techniques.

Still another object of the invention is to prepare stable, high-purity, finely divided, cuprous oxide products especially suitable for use as red pigments in marine coatings.

A further object of the invention is to provide processes for preparing bright copper powders of suitable purity for use in powder metallurgy and related fields.

These and other, further, and more specific objects and advantages of the invention will become apparent from the following detailed description taken in conjunction with the drawings, in which.

Briefly, in accordance with my invention, I have now discovered that valuable high-purity copper products can be prepared from "cement copper" by an integrated process comprising the steps of (a) separating a copper concentrate from the cement copper; (b) preparing a cupric ammonia complex solution by reacting the concentrate with oxygen and an aqueous solution of complexing reagents comprising ammonia and an ammonium salt selected from the class consisting of ammonium carbonate and ammonium sulfate; (c) reducing the cupric ammonia complex to the corresponding cuprous ammonia complex by reacting the solution with a reducing agent which is either sulfur dioxide or the cement copper concentrate prepared in step (a); (d) decomposing the cuprous ammonia complex to obtain a copper product, either copper metal or cuprous oxide, recovering at least a portion of the complexing reagents; and (e) recycling the recovered complexing reagents for use in preparing additional cupric ammonia complex solution as in step (b).

Figure 1:
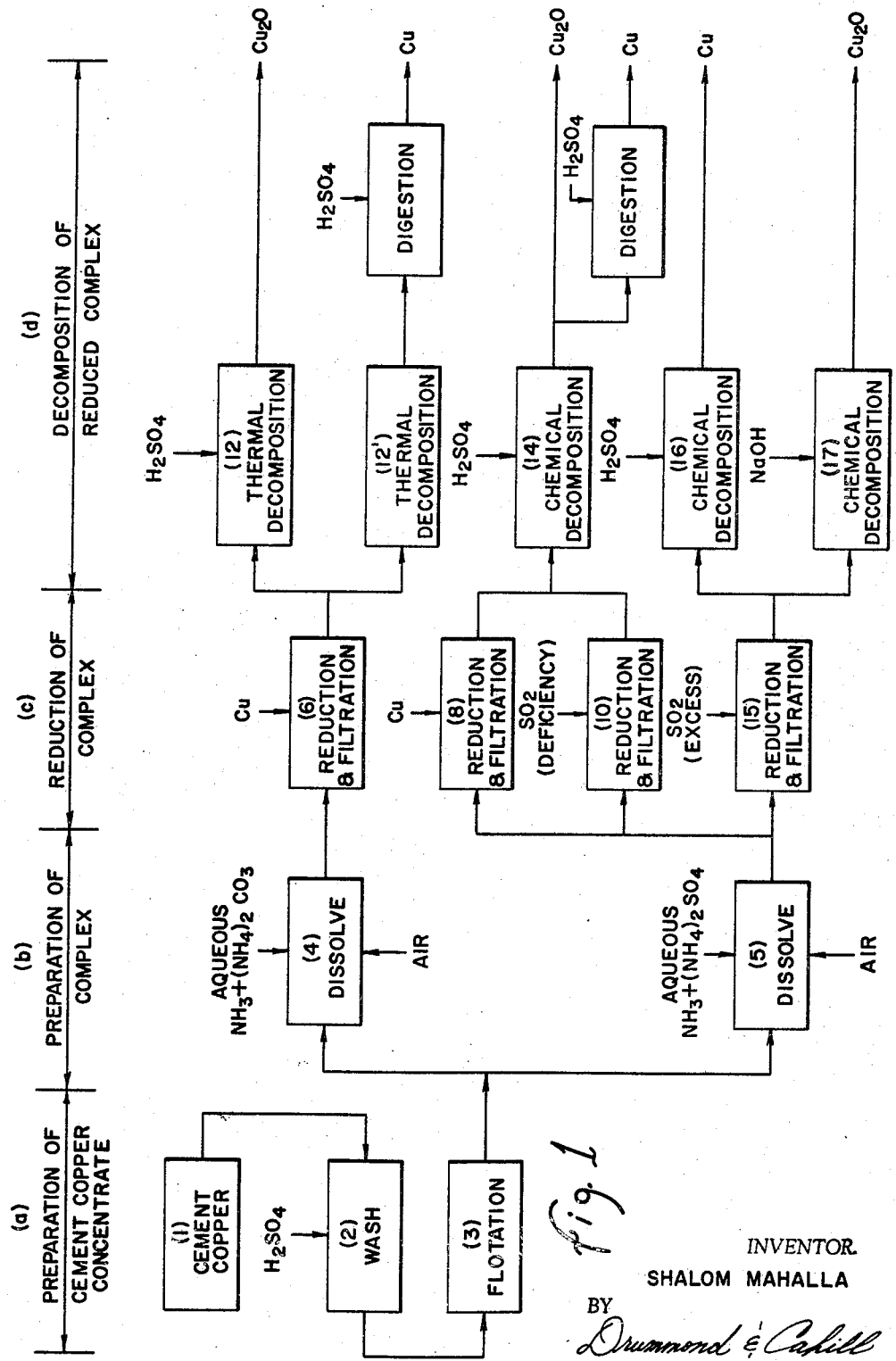
FIG. 1 is a flow sheet generally illustrating the processes of the present invention with particular emphasis on the optional procedures which form different embodiments of my invention.

Turning now to FIG. 1 in which the process of the present invention is generally illustrated and which depicts several alternate embodiments of the invention, it will be noticed that the process of the present invention includes four general operations, viz., (a) beneficiation of the cement copper raw material to produce a concentrate, (b) preparation of a practically pure cupric ammonia complex, (c) reduction of the complex, and finally, (d) decomposition of the reduced complex to obtain the desired copper products.

As shown in FIG. 1, the operation of preparation of the cement copper concentrate (steps 1-3) is common to each of the embodiments of the invention. The cupric ammonia complex can be prepared by dissolving the cement copper complex in an aqueous solution of ammonia and ammonium carbonate as shown at step 4, or in an aqueous solution of ammonia and ammonium sulfate as shown at step 5. The carbonate complex solution from step 4 is reduced (step 6) by contacting the solution with additional cement copper concentrate from step 2 or 3. In step 6, the cupric ammonia carbonate complex is reduced to cuprous ammonia carbonate which is then thermally decomposed, as by vacuum distillation as shown in steps 12 and 12'. If the thermal decomposition of the cuprous ammonia carbonate is carried out under carefully controlled non-oxidizing conditions by excluding air and, if the pH of the decomposition mixture is controlled at between about 3 and 5 at least during the terminal portion of the decomposition period, such as by the addition of suitable quantities of sulfuric acid, the resulting product, directly obtained by precipitation from the decomposition mixture, is finely divided, bright red cuprous oxide. Alternatively, if the thermal decomposition is carried out at autogenous pH, the precipitate is a brown, mud-like cuprous oxide which is converted as at step 13 by digestion with sulfuric acid to a bright, finely divided, high-purity copper powder.

If the cement copper concentrate is converted to the corresponding cupric ammonia sulfate complex as at step 5, the complex is reduced to a corresponding cuprous ammonia sulfate solution by reduction with either cement copper concentrate (step 8) or with a stoichiometric deficiency of sulfur dioxide (step 10). The resulting cuprous ammonia sulfate solution is then decomposed at step 14 by reaction with sulfuric acid to obtain the bright red, finely divided cuprous oxide product. On the other hand, if the cuprous ammonia sulfate complex is reduced with a stoichiometric excess of sulfur dioxide (step 15), the cuprous ammonia sulfate complex is reduced to the corresponding cuprous ammonia sulfite which crystallizes from the reduction mixture of step 15. The cuprous ammonia sulfite crystals are then decomposed with sulfuric acid (step 16) to yield bright, high-purity copper powder or, alternatively, the crystals are decomposed by reaction with sodium hydroxide (step 17) to yield the bright red, finely divided cuprous oxide product.

Each of the alternative embodiments of the invention generally described above will be described in more detail below.

PREPARATION OF CEMENT COPPER CONCENTRATE

The details of preparation of the cement copper concentrate are the same in each of the alternative embodiments of the invention. Referring again to FIG. 1 which illustrates the presently preferred practice, cement copper is obtained as a precipitate by reaction of dilute aqueous copper sulfate solutions with metallic iron according to Equation 1 above. According to the presently preferred embodiment of the invention, the raw cement copper is subjected to size separation, for example, by rough cycloning or screening through 65 or 100 mesh screens. The undersize material is agitated with dilute sulfuric acid (200 g./l. acid equivalent) to make a 20% solids slurry. Agitation of the slurry is continued for a sufficient time to convert iron and basic salt impurities to soluble sulfates. This is usually accomplished in about 30 minutes. Thereafter, the acid-washed cement copper is washed several times with water to remove residual acid. In a typical case, the acid-washed cement copper will analyze approximately 96% Cu, the principal impurities being carbonaceous materials and so-called "acid insolubles."

Following the acid washing step (step 2, FIG. 1), the acid-washed cement copper may be introduced directly to the complexing operation. However, advantageously, the concentrate from step 2 is subjected to flotation to separate additional impurities. The flotation is preferably carried out by first subjecting the acid-washed cement copper from step 2 to basic flotation at about 5-20% pulp density, maintaining the pH of the flotation mixture above 7 by the addition of caustic soda which also acts as a depressant for copper. The recommended flotation promoters are fuel oil, anionic sulfonates such as "R-825" (a product commercially available from American Cyanamid Company) and pine oil, each present in about 1-5 pounds/ton of cement copper. The basic float removes substantially all of the carbonaceous materials, the bulk of the copper being recovered as "tails." Following the basic float, the copper is activated in an acid circuit at a pH below 2, using sulfuric acid for pH control and as a silica depressant. The copper readily floats leaving the bulk of the remaining acid-insolubles as "tails." Recommended flotation promoters for use in the acid circuit are "Minirec A" and "Dowfroth 250," in amounts of 1-5 pounds of each per ton of cement copper. Two-step "cleaning" is preferred and good selectivity is achieved at a low-solids content of approximately 5%. Following the acid float, the concentrate is washed with dilute sulfuric acid (20 g./l. acid) followed by sufficient water washes to remove substantially all excess flotation reagents. The final copper product typically analyzes approximately 99.0% Cu and is suitable for direct use in certain powder metallurgy applications where the remaining impurities are acceptable.

As an alternative procedure, the acid digestion step (step 2 of FIG. 1) can be eliminated by subjecting the raw cement copper directly to basic flotation at the natural pH of the cement copper. Fuel oil with R-825 and pine oil are used to float all of the carbonaceous material. At this point, the tails still contain all the metallic iron that comprises the main impurity in cement copper. The cement copper is then subjected to the acid float as described above and any acid that is added for pH control reacts immediately with the metallic iron and is consumed until all the metallic iron dissolves. Thus, the first acid added acts as a digesting reagent and as a rough silica depressant. When this concentrate is subjected to the second and third cleaning steps, a final copper product of approximately 99.0% purity is obtained. Although the purity is comparable to the product of my preferred embodiment wherein the cement copper is first washed and then "floated," the concentrate obtained by the alternate procedure just described lacks the high luster obtained in my preferred method. Also, the selectivity in the alternate method is greatly reduced due to the presence of ferrous salts in the float.

METHODS INVOLVING CUPRIC AMMONIA CARBONATE COMPLEX INTERMEDIATE

Figure 2:
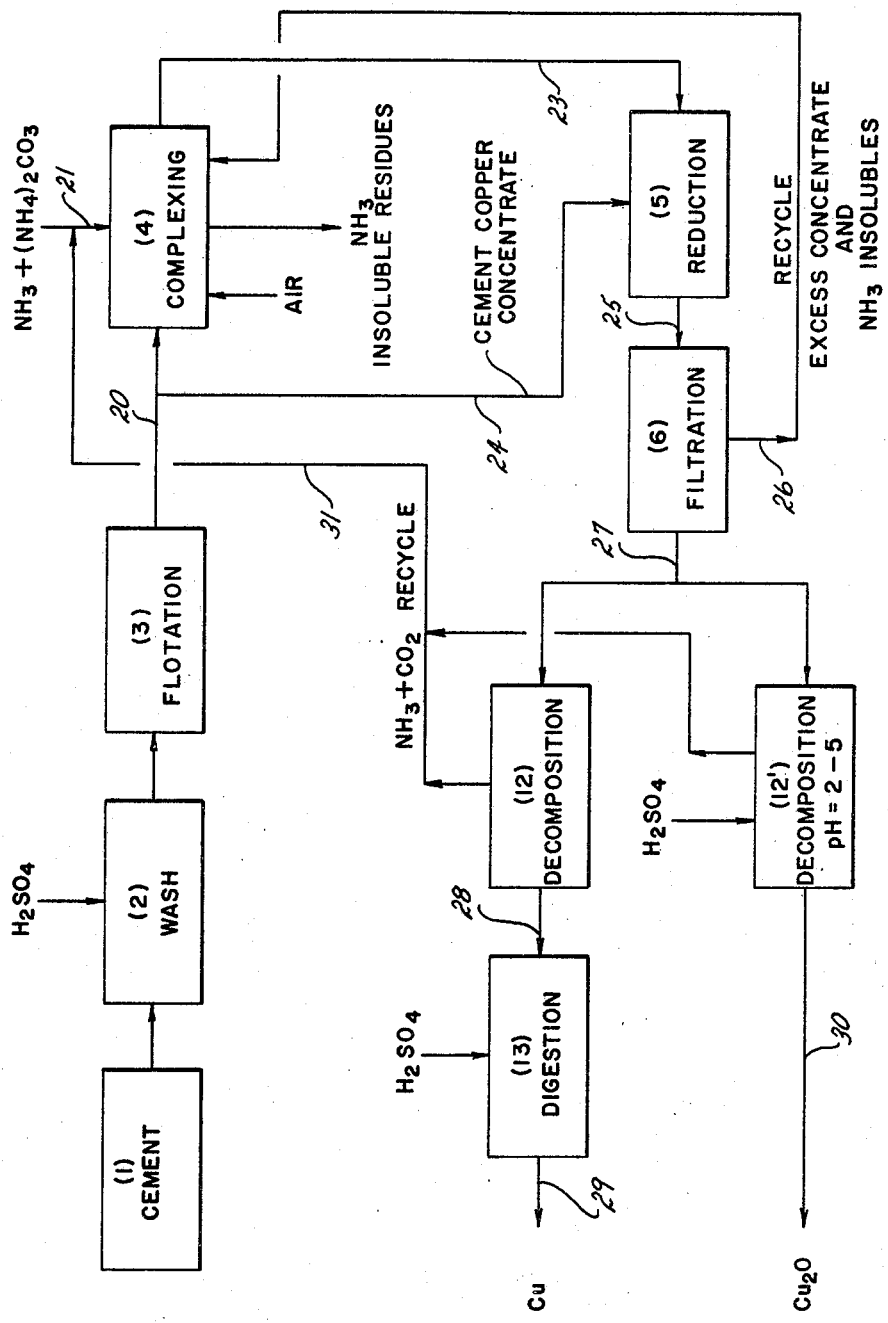
FIG. 2 is a more detailed flow sheet illustrating the production of copper or cuprous oxide products which involves preparing a cuprous ammonia carbonate complex intermediate.

Turning now to FIG. 2 in whihc the techniques and methods of my invention which involve the preparation of cupric ammonia carbonate complex intermediate are described in greater detail, it will be noticed that the steps of preparing the cement copper concentrate (steps 1-3) are the same as described above. The bulk of the cement copper concentrate 20 is converted to a solution of cupric ammonia carbonate complex by reaction with complexing reagents comprising an aqueous ammonia-ammonium carbonate solution 21 in the presence of oxygen supplied by an airstream 22 which is bubbled through the reaction mixture. The conversion of the copper to the cupric ammonia carbonate complex proceeds according to the following equation:

[2] $Cu + NH_3 + (NH_4)_2CO_3 + \frac{1}{2}O_2 \rightarrow Cu(NH_3)_4CO_3 + H_2O$ The copper is readily and directly soluble in the solution of complexing reagents and impurities normally associated with the cement copper concentrate will not be taken into solution, so that the resulting complex solution is pure in the sense that copper is the only metal ion which is present in any appreciable quantity.

The cupric ammonia carbonate complex is then reduced (step 5) by reacting the solution 23 with an additional quantity of the cement copper concentrate 24 from step 2 or 3. Preferably, the concentrate is present in a stoichiometric excess to promote the maximum conversion of the cupric complex to the corresponding cuprous complex. The reaction involved in the reduction of the cupric ammonia carbonate complex is as follows:

(3) $Cu(NH_3)_4CO_3 + Cu \rightarrow Cu_2(NH_3)_4CO_3$

After the reduction is complete, the reaction mixture 25 is filtered (step 6) to seperate the excess reducing cement copper concentrate from the solution of cuprous ammonia carbonate. This excess concentrate and any $NH_3$ insolubles are recycled 26 to the complexing step (step 4).

Of course, as will be appreciated by those skilled in the art, it is necessary to continuously or periodically bleed portions of this recycled stream to avoid buildup of $NH_3$ insolubles in the process system. The filtrate 27, comprising a high-purity solution of cuprous ammonia carbonate, is decomposed according to alternative procedures to yield either copper metal or cuprous oxide products. If a copper product is desired, the cuprous ammonia carbonate complex solution is decomposed (step 12) at autogenous pH by simple heating with air excluded for a period of time sufficient to drive off the ammonia and carbon dioxide decomposition products from the reaction mixture according to the following equation:

[4] $Cu_2(NH_3)_4CO_3 \xrightarrow[70-85°C]{\Delta} 4NH_3\uparrow + CO_2\uparrow + Cu_2O$ yielding a brown, mud-like cuprous oxide precipitate 28 which, when digested with dilute sulfuric acid (step 13) according to the following equation:

(5) $Cu_2O + H_2SO_4 \rightarrow Cu + CuSO_4 + H_2O$ yields a copper product 29 in the form of finely divided, bright, high-purity copper metal of a purity exceeding that required for substantially any powder metallurgy process.

Alternatively, if a cuprous oxide product is desired, the cuprous ammonia carbonate complex solution 27 is decomposed (step 12') by heating under carefully controlled, non-oxidizing conditions by excluding air, suitably by vacuum distillation, while maintaining the pH of the decomposition mixture at between about 2-5 by addition of suitable quantities of sulfuric acid at least during the terminal portion of the vacuum distillation. The reaction proceeds as follows:

[6] $Cu_2(NH_3)_4CO_3 \xrightarrow[pH\ 2-5]{\underset{\Delta}{70-85°C}} Cu_2O\downarrow + 4NH_3\uparrow + CO_2\uparrow$ By this method, I am able to directly obtain as a precipitate from the decomposition mixture a bright red, finely divided, cuprous oxide product which is exceedingly stable and which is highly desirable for use as a pigment in various marine coatings.

Ammonia and carbon dioxide evolved from the decomposition mixtures (step 12 or 12') are recycled 31 to the complexing step (step 4).

For all practical purposes, the reactions set forth above proceed to stoichiometric completion such that details of quantities of reagents, recycled byproducts, and final products need not be set forth herein.

Example 1

In order to further illustrate the practice of this embodiment of my invention, the following example illustrates the presently preferred practice thereof.

A raw cement copper product was prepared by reacting a dilute copper sulfate solution with shredded scrap steel. After separation from the reaction liquor, the precipitated cement copper (dry basis) contained 80 wt. percent copper, 5 wt. percent iron, 3 wt. percent insolubles, and 12 percent miscellaneous impurities, mainly oxygen. The raw cement copper was screened through a 65-mesh screen and a sufficient quantity of the undersize material to yield a 20 percent solids slurry was agitated for approximately 30 minutes with dilute sulfuric acid (200 g./l.). Thereafter, the liquid as decanted and the cement copper was washed with water to remove residual acid and analyzed (dry basis) 96 percent Cu.

The washed cement copper was then subjected to basic flotation by reslurrying to 10 percent pulp density and maintaining the pH of the flotation mixture above 7 by the addition of caustic soda which also acts as a depressant for copper. The promoters were fuel oil, "R-825" and pine oil at 3.0 pounds of each per ton of cement copper. The cement copper concentrate was recovered as the "tails" from the flotation mixture, substantially all of the carbonaceous materials being separated as the float.

Following the basic float, the copper was floated in an acid circuit at a pH below 2, using two cleaning steps. Sulfuric acid was added for pH control and as a silica depressant. "Minirec A" and "Dowfroth 250" were used as promoter and frother, respectively, in amounts of 3.0 pounds of each per ton of cement cooper. The pulp density was maintained at about 5 percent solids.

Following the acid float, the cement copper concentrate was washed with dilute sulfuric acid (20 g./l.) and three water washes to remove substantially all excess flotation reagents. The final cement copper concentrate analyzed approximately 99 percent Cu.

The cement copper concentrate was then mixed with water to prepare a slurry containing approximately 5 percent solids. Anhydrous ammonia and ammonium carbonate were added to the slurry in amounts of 1 part by wt. ammonia and 2 parts by wt. ammonium carbonate per part of copper. The resulting mixture was agitated violently in a reaction vessel (Fagregen Flotation Machine) through which air was continuously passed.

Agitation of the complexing mixture was continued for approximately 2½ hours and, thereafter, the ammonia insolubles were filtered from the reaction mixture, weighed and analyzed. The washed residue weighed approximately 1% by weight of the original concentrate and contained less than 2% of the total copper in the concentrate feed.

The filtrate was combined with the first wash water; the resulting solution analyzed 38 grams of copper per liter. This solution was reslurried with a 10:1 stoichiometric excess of the cement copper concentrate product of the flotation step to make a 20% solids slurry. The resulting mixture was agitated violently for two hours in a separate tank from which air and oxygen were carefully excluded. After this time, the solution was practically clear, indicating a full reduction of the cupric ammonia carbonate complex to the corresponding cuprous complex. Excess concentrate and ammonia-insolubles were filtered from the reduction mixture by vacuum filtration and the solution of cuprous ammonia carbonate complex was transferred to a vacuum distillation column.

Vacuum distillation of the cuprous complex solution was continued at a temperature of 70–85° C. until evolution of ammonia and carbon dioxide ceased. A brown, mud-like cuprous oxide precipitate was recovered from the distillation mixture by vacuum filtration. The cuprous oxide precipitate mud was digested with dilute sulfuric acid (200 grams per liter) to convert the precipitate to copper metal powder analyzing 99.9% Cu and a solution of copper sulfate containing 25 grams of copper per liter.

To a separate portion of the mud-like cuprous oxide precipitate, a very dilute sulfuric acid was added in amounts sufficient to neutralize all the residual ammonia and corresponding salts and maintain a pH between 2 and 4. The slurry was heated at approximately 70° C. for a period of 30 minutes. The red cuprous oxide obtained analyzed over 95% copper oxide.

Preferably, if it is desired to obtain the bright red cuprous oxide directly, a treatment with sulfuric acid can be accomplished without first separating the brown, mud-like cuprous oxide intermediate from the vacuum filtration mixture. In this embodiment, sufficient sulfuric acid of a concentration of approximately 200 g./l. is added directly to the vacuum distillation mixture at the time when the odors of ammonia and carbon dioxide are only faint. This converts the brown, mud-like cupric oxide precipitate directly to the desired bright red cuprous oxide final product.

METHODS INVOLVING CUPRIC AMMONIA SULFATE COMPLEX INTERMEDIATE

Reduction to cuprous ammonia sulfate

Figure 3:
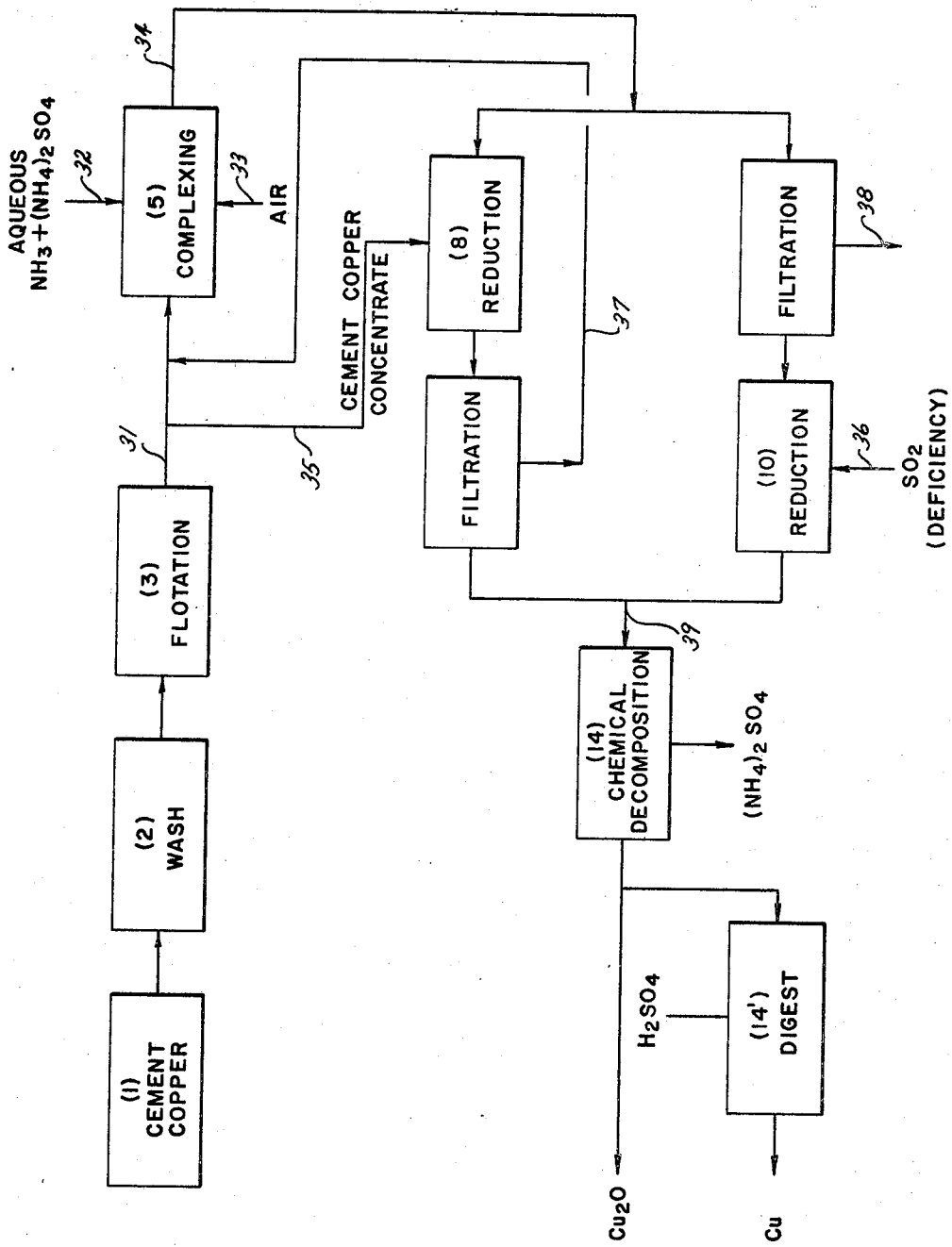
FIG. 3 is a more detailed flow sheet illustrating the production of copper or cuprous oxide products which involves preparing a cuprous ammonia sulfate complex intermediate.

Turning now to FIG. 3 in which the techniques and methods of my invention which involve the preparation of cupric ammonia sulfate complex intermediate are described in greater detail, the steps of preparing the cement copper concentrate (steps 1–3) are the same as described above. The cement copper concentrate 31 is converted to a solution of cupric ammonia sulfate complex by reaction with complexing reagents comprising an aqueous ammonia-ammonium sulfate solution 32 in the presence of oxygen supplied by an airstream 33 which is bubbled through the reaction mixture. The conversion of the cement copper concentrate to the cupric ammonia sulfate complex proceeds according to the following equation:

[7] $Cu + 2NH_3 + (NH_4)_2SO_4$
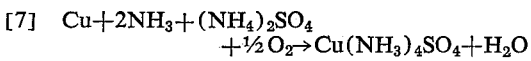
$+ \frac{1}{2} O_2 \rightarrow Cu(NH_3)_4SO_4 + H_2O$ The copper is readily and directly soluble in the solution of complexing reagents and the impurities normally associated with the cement copper concentrate will not be taken into solution, so that the resulting complex solution is pure in the sense that copper is the only metal ion which is present in any appreciable quantity. The cupric ammonia sulfate complex 34 can then be reduced by either of two alternate methods, by reaction (step 8) with excess quantities of cement copper concentrate 35 from step 3, or by reaction (step 10) with a stoichiometric deficiency of sulfur dioxide 36. If the reduction is accomplished by contact with copper as in step 8, the reduced solution is then filtered to remove the excess cement copper concentrate which is then returned 37 to the complexing step (step 5). If sulfur dioxide is employed as the reducing agent, the cupric ammonia sulfate complex solution 34 is filtered prior to the reducing step (step 10) to separate the ammonia insoluble residue 38 which is discarded.

The solution of cuprous ammonia sulfate complex 39 which is obtained from either of the reduction steps 8 or 10, it chemically decomposed (step 14) by reaction with sulfuric acid. If the desired product is the bright red cuprous oxide, sufficient sulfuric acid is employed at this step to maintain the pH of the decomposition mixture at between about 2–5. On the other hand, if a copper metal product is desired, sufficient additional sulfuric acid is employed in the decomposition mixture (step 14') to decompose the cuprous oxide, yielding the copper product. The equations for these reactions are:

[8] $Cu_2(NH_3)_4SO_4 + H_2SO_4 + H_2O \xrightarrow{\Delta} Cu_2O + 2(NH_4)_2SO_4$

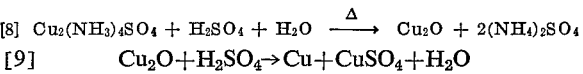

[9] $Cu_2O + H_2SO_4 \rightarrow Cu + CuSO_4 + H_2O$

The copper and cuprous oxide products obtained in this alternative embodiment of my invention are equivalent in quality to that described hereabove. For all practical purposes, the reactions set forth above proceed to stoichiometric completion such that details of quantities of reagents, recycled byproducts and final products need not be set forth herein.

Example 2

In order to further illustrate the practice of this embodiment of my invention, the following example illustrates the presently preferred practice thereof.

The cement copper concentrate, prepared as in Example 1, was mixed with water to prepare a slurry containing approximately 5% solids. Anhydrous ammonia (one part by weight per part of copper) and ammonium sulfate (two parts by weight per part of copper) were added to the slurry and the resulting mixture was agitated violently in a reaction vessel (Fagregen-type flotation machine) through which air was continuously passed. The insoluble residue contained approximately 2.5 wt. percent of the total copper in the cement copper concentrate feed. The cupric ammonium sulfate complex analyzed 29 g./l. copper. The cupric ammonia sulfate complex was reduced by repulping with excess cement copper as in Example 1. Then the excess cement copper was separated from the reduced cupric complex solution. The complex solution was decomposed by adding 5% sulfuric acid to obtain a final pH of about 2.5. During the decomposition period, the solution was agitated continuously and heated at about 80° C. Decomposition was complete in approximately 30 minutes. A bright red cuprous oxide product was obtained as a precipitate from the decomposition mixture.

As an alternative embodiment of the invention, the cupric ammonia sulfate complex was reacted with sulfur dioxide gas which was bubbled slowly through the solution until a faint blue coloration persisted, indicating virtually complete reduction of the copper. Preferably, the cupric complete solution is heated to boiling during the introduction of $SO_2$ to drive off any unreacted $SO_2$ which might otherwise dissolve in the reduction mixture and interfere by providing a stoichiometric excess. Thereafter, dilute sulfuric acid (5%) was added to the solution of reduced complex to obtain a comparable bright red cuprous oxide product.

REDUCTION TO CUPROUS AMMONIA SULFITE

Figure 4:
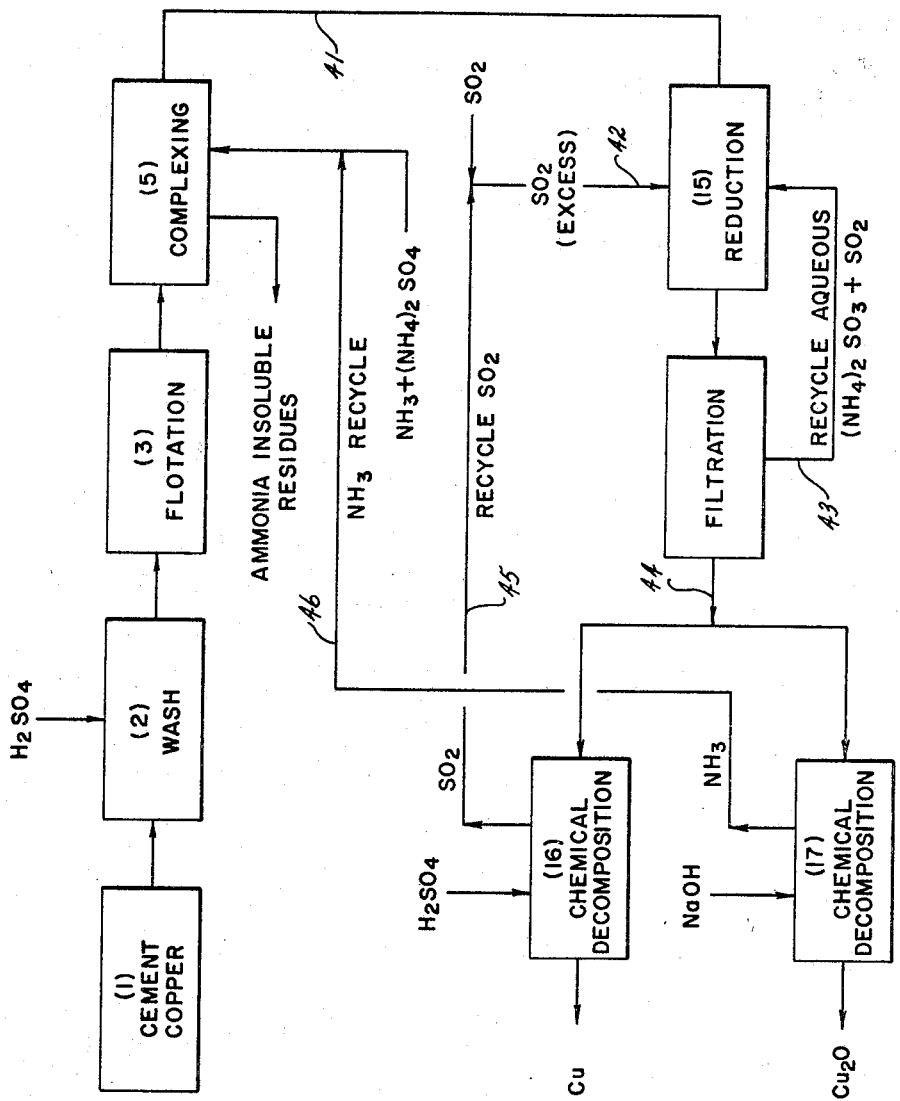
FIG. 4 is a more detailed flow sheet illustrating the production of cuprous oxide or copper products which involves preparing a cuprous ammonia sulfite complex intermediate.

Turning now to FIG. 4, in which the cupric ammonia sulfate complex, prepared as described above, is reduced to a cuprous ammonia sulfite complex, it will be noticed that the steps of preparing the cement copper concentrate (steps 1–3) and the dissolution of the cement copper concentrate in an aqueous ammonia-ammonium sulfate complexing reagent (step 5) are the same as described in connection with FIG. 3.

After obtaining the solution of cupric ammonia sulfate complex (step 5), the solution 41 is reduced by reaction with a stoichiometric excess of sulfur dioxide 42. Upon reduction, the cupric ammonia sulfate complex is converted to cuprous ammonia sulfite which crystallizes from the reduction mixture. The reaction probably proceeds according to the following equation:

[10] $2Cu(NH_3)_4SO_4 + 2SO_2 + 3H_2O \rightarrow$
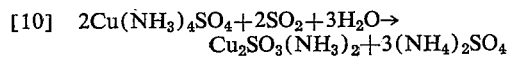
$Cu_2SO_3(NH_3)_2 + 3(NH_4)_2SO_4$ The aqueous ammonium sulfite liquor 43 containing dissolved sulfur dioxide is recycled to the reduction step (step 15). The copper ammonium sulfite crystals 44 can be chemically decomposed by either reaction with sulfuric acid (step 16) to produce a copper product or reaction with sodium hydroxide (step 17) to produce a bright red cuprous oxide product. Sulfur dioxide evolved during the decomposition with sulfuric acid is recycled 45 to the reduction step and ammonia evolved during the decomposition with sodium hydroxide is recycled 46 to the complexing step.

The chemical decomposition of cuprous ammonia sulfite according to the alternative procedures proceeds according to the following equations:

[11] $Cu_2SO_3(NH_3)_2 + 2H_2SO_4 \rightarrow$
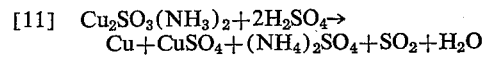
$Cu + CuSO_4 + (NH_4)_2SO_4 + SO_2 + H_2O$

[12] $Cu_2SO_3(NH_3)_2 + 2NaOH \rightarrow$
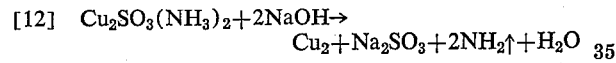
$Cu_2 + Na_2SO_3 + 2NH_2\uparrow + H_2O$ For all practical purposes, the reactions set forth above proceed to stoichiometric completion such that details of quantities of reagents, recycled byproducts and final products need not be set forth herein.

Example 3

In order to further illustrate the practice of this embodiment of my invention, the following example illustrates the presently preferred practice thereof.

A cement copper concentrate is prepared in accordance with the procedures set forth in Example 1. The concentrate is converted to a cupric ammonia sulfate complex according to the procedures set forth in Example 2.

The solution of cupric ammonia sulfate is reduced by reaction with excess sulfur dioxide, introduction of $SO_2$ being continued until a yellowish crystalline cuprous ammonia sulfite is precipitated. No heating is necessary as the reaction is exothermic.

The sulfite crystals were filtered and transferred to separate containers for chemical decomposition. In the first case, a portion of the crystals were decomposed by reaction with 20% sulfuric acid. Sufficient sulfuric acid was added to complete the evolution of sulfur dioxide and the slurry was agitated thoroughly for approximately 30 mintues. The resulting copper metal was filtered from the reaction mixture and dried under a natural gas atmosphere to avoid oxidation. The product analyzed 99.9% copper.

Alternatively, a second portion of the sulfite crystals were decomposed with sodium hydroxide. Sufficient sodium hydroxide was added to complete the evolution of ammonia and the solution was heated to boiling until no ammonia odor was detected. The bright red cuprous oxide precipitate was filtered and washed from the decomposition mixture.

The copper and cuprous oxide products obtained were comparable in quality to that described hereabove.

SUMMARY

From the foregoing written description taken in conjunction with the drawings, it will be apparent to those skilled in the art that I have provided a convenient, economical and simple, yet effective, method for converting cement copper to valuable copper products without employing intermediate pyrometallurgical or catalytic techniques. All of the foregoing reactions may be conducted in conventional process vessels, employing materials of construction which are well known and which require no special fabrication techniques. However, the processes of my invention are to be clearly distinguished from the rather complicated and prohibitively expensive selective precipitation processes of the prior art wherein the complex solution contains substantial quantities of other metals in addition to copper. In such prior art processes, the separation of the various metals is accomplished by selective precipitation employing delicate and complicated control of pressure, temperature, pH and other process variables. In my process, however, all metals other than copper which are soluble in ammonia are excluded from the complexing reaction such that the complex solution contains no appreciable quantities of other metals.

I claim:

1. An integrated process for preparing high-purity copper products from cement copper, comprising in order the steps of:
   (a) separating a powdered copper concentrate containing at least about 60% copper metal from said cement copper;
   (b) preparing a cupric ammonia complex solution in which copper is substantially the only metal ion present by reacting said concentrate in the presence of oxygen with an aqueous solution of complexing reagents comprising ammonia and an ammonium salt selected from the class consisting of ammonium carbonate and ammonium sulfate;
   (c) substantially completely reducing said cupric ammonia complex to the corresponding cuprous ammonia complex by reacting said solution of cupric ammonia complex with a reducing agent selected from the class consisting of:
       sulfur dioxide, and
       the concentrate of step (a);
   (d) decomposing substantially all of said cuprous ammonia complex at not substantially in excess of atmospheric pressure to obtain
       a copper product, and
       at least a portion of said complexing reagents; and
   (e) recycling said complexing reagents obtained in step (d) for use in step (b).

2. Process of claim 1 in which:
   (a) said cupric ammonia complex is prepared by dissolving said concentrate in the presence of oxygen in an aqueous solution of ammonia and ammonium carbonate;
   (b) the resulting aqueous cupric ammonia carbonate complex solution is reacted with a stoichiometric excess of said concentrate to reduce substantially all of said complex to cuprous ammonia carbonate complex solution;
   (c) excess concentrate is separated from the cuprous ammonia carbonate complex solution and recycled to step (b) of claim 1;
   (d) the cuprous ammonia carbonate complex solution is thermally decomposed by heating under subatmospheric pressure with evolution of ammonia and carbon dioxide complexing reagents; and
   (e) said complexing reagents are recycled to step (b) of claim 1.

3. Process of claim 2 wherein in thermal decomposition of the cuprous ammonium carbonate complex solution is carried out by vacuum distilling said solution while maintaining the pH of said solution between 2 and 5 by addition of sulfuric acid, thereby to obtain directly a copper product consisting essentially of precipitated bright red particles of cuprous oxide.

4. Process of claim 2 wherein the thermal decomposition of the cuprous ammonia carbonate complex solution is carried out by vacuum distillation at autogenous pH to obtain a brown, mud-like intermediate $Cu_2O$ product, and digesting said intermediate with sulfuric acid to produce high-purity copper metal.

5. Process of claim 1 in which:
(a) said cupric ammonia complex is prepared by dissolving said concentrate in the presence of oxygen in an aqueous solution of ammonia and ammonium sulfate;
(b) the resulting aqueous cupric ammonia sulfate complex solution is substantially completely reduced to the corresponding cuprous ammonia sulfate complex by reacting said solution with a reducing agent selected from the class consisting of:
a stoichiometric deficiency of sulfur dioxide, and the copper precipitate concentrate of claim 1, step (a);
(c) decomposing said cuprous ammonia sulfate complex by reacting said complex with sulfuric acid to obtain a copper product consisting essentially of precipitated bright red particles of cuprous oxide and, as a byproduct, ammonium sulfate.

6. Process of claim 1 wherein:
(a) said cupric ammonia complex is prepared by dissolving said concentrate in the presence of oxygen in an aqueous solution of ammonia and ammonium sulfate;
(b) the resulting aqueous cupric ammonia sulfate complex solution is reacted with a stoichiometric excess of sulfur dioxide to substantially completely reduce said complex to cuprous ammonia sulfite crystals;
(c) separating said cuprous ammonia sulfite crystals from the crystallization mixture of step (b); and
(d) said resulting cuprous ammonia sulfite crystals are decomposed by reacting said complex with a decomposing reagent selected from the class consisting of sulfuric acid and sodium hydroxide to obtain a copper product.

7. Process of claim 6 wherein said decomposing reagent is sulfuric acid and said copper product is high-purity copper metal.

8. Process of claim 6 wherein said decomposing reagent is sodium hydroxide and said copper product consists essentially of bright red particles of cuprous oxide.

9. An integrated process for preparing high-purity copper products selected from the class consisting of finely divided copper metal and cuprous oxide, comprising in order the steps of:
(a) separating a powdered copper concentrate containing at least about 96% wt. copper metal from said cement copper by:
washing said cement copper with dilute aqueous sulfuric acid, and
separating copper and wash-acid insolubles from the washing mixture;
(b) preparing a cupric ammonia complex solution in which copper is substantially the only metal ion present by reacting said concentrate in the presence of oxygen with an aqueous solution of complexing reagents comprising ammonia and an ammonium salt selected from the class consisting of ammonium carbonate and ammonium sulfate;
(c) substantially completely reducing said cupric ammonia complex to the corresponding cuprous ammonia complex by reacting said solution of cupric ammonia complex with a reducing agent selected from the class consisting of:
sulfur dioxide, and
the concentrate of step (a);
(d) decomposing said cuprous ammonia complex at not substantially in excess of atmospheric pressure to obtain:
a copper product, and
at least a portion of said complexing reagents; and
(e) recycling said complexing reagents obtained in step (d) for use in step (b).

10. The process of claim 9 in which the copper concentrate is separated from the cement copper by:
washing said cement copper with dilute aqueous sulfuric acid, and
separating copper and wash-acid insolubles from the washing mixture;
preparing a flotation mixture of said copper and said wash-acid insolubles; and
separating a powdered concentrate containing at least about 99%/wt. copper metal of said cement copper from the flotation mixture.

References Cited
UNITED STATES PATENTS

| | | | |
|---|---|---|---|
| 2,474,497 | 6/1949 | Rowe | 23—147 |
| 2,647,831 | 8/1953 | Allen et al. | 75—103 |
| 2,647,832 | 8/1953 | Allen et al. | 75—108 |
| 2,665,192 | 1/1954 | Rowe | 23—147 |
| 2,727,819 | 12/1955 | Kenny et al. | 75—103 |
| 3,148,051 | 9/1964 | Chupungco et al. | 75—103 |
| 3,282,675 | 11/1966 | Parker | 75—117 |

L. DEWAYNE RUTLEDGE, Primary Examiner

T. R. FRYE, Assistant Examiner

U.S. Cl. X.R.

23—55, 147; 75—108, 117